United States Patent
Hannu et al.

(10) Patent No.: US 8,422,435 B2
(45) Date of Patent: Apr. 16, 2013

(54) ENHANCING COVERAGE FOR HIGH SPEED DOWNLINK PACKET ACCESS (HSDPA) CHANNEL

(75) Inventors: Hans Hannu, Luleå (SE); Mårten Ericson, Luleå (SE); Kristofer Sandlund, Gammelstad (SE); Per Synnergren, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 803 days.

(21) Appl. No.: 11/617,788

(22) Filed: Dec. 29, 2006

(65) Prior Publication Data

US 2008/0002646 A1   Jan. 3, 2008

Related U.S. Application Data

(60) Provisional application No. 60/806,432, filed on Jun. 30, 2006.

(51) Int. Cl.
*H04B 7/00* (2006.01)
*H04B 1/00* (2006.01)
*H04W 4/00* (2009.01)

(52) U.S. Cl.
USPC ............................ 370/329; 455/522; 375/148

(58) Field of Classification Search .......... 370/328–332; 455/436; 375/148
See application file for complete search history.

(56) References Cited

U.S. PATENT DOCUMENTS

| 7,346,077 | B2 | 3/2008 | Tourunen et al. |
| 2003/0012200 | A1 | 1/2003 | Salamat |
| 2003/0210660 | A1 | 11/2003 | Wiberg et al. |
| 2005/0043051 | A1* | 2/2005 | Takano et al. ................. 455/522 |
| 2005/0074002 | A1 | 4/2005 | Yoakum et al. |
| 2005/0201499 | A1* | 9/2005 | Jonsson ......................... 375/348 |
| 2005/0245266 | A1* | 11/2005 | Viero et al. .................... 455/450 |

(Continued)

FOREIGN PATENT DOCUMENTS

| EP | 0 715 479 A1 | 6/1996 |
| EP | 0 847 146 A2 | 6/1998 |

(Continued)

OTHER PUBLICATIONS

International Search Report and Written Opinion mailed Jul. 25, 2007 in corresponding PCT application PCT/SE2006/050633.

(Continued)

*Primary Examiner* — George Eng
*Assistant Examiner* — Nizar Sivji
(74) *Attorney, Agent, or Firm* — Nixon & Vanderhye, P.C.

(57) ABSTRACT

A method of operating a base station node (21) comprises obtaining an indication of degradation of a radio link connection between the base station node and the user equipment unit (UE) which is carried by the a high speed packet channel (HSDPA). In accordance with the distance indication, the transmission priority for the radio link connection is modified. Preferably the indication of degradation is a distance indication of distance of a user equipment unit (23) involved in the radio link connection from the base station node (21). The transmission priority can be modified for one or both of downlink and uplink transmissions for the user equipment unit (UE). Preferably the transmission priority is modified for the radio link connection, e.g., for the user equipment unit (UE), as a function of the indication.

24 Claims, 9 Drawing Sheets

U.S. PATENT DOCUMENTS

| | | | |
|---|---|---|---|
| 2006/0072510 | A1 | 4/2006 | Aizawa |
| 2006/0077947 | A1* | 4/2006 | Kim et al. .................... 370/349 |
| 2006/0146749 | A1 | 7/2006 | Lundh et al. |
| 2006/0203823 | A1 | 9/2006 | Jiang |
| 2007/0127522 | A1 | 6/2007 | Lundh et al. |
| 2008/0159184 | A1* | 7/2008 | Niwano .................... 370/278 |

FOREIGN PATENT DOCUMENTS

| | | |
|---|---|---|
| EP | 1 401 230 A1 | 3/2004 |
| EP | 1 615 347 A2 | 1/2006 |
| EP | 1 708 383 A1 | 10/2006 |
| WO | 93/12623 A1 | 6/1993 |
| WO | 00/65852 A1 | 11/2000 |
| WO | 02/091659 A2 | 11/2002 |

OTHER PUBLICATIONS

U.S. Appl. No. 11/617,792, filed Dec. 29, 2006, entitled "Enhanced Packet Service for Telecommunications".

International Search Report and Written Opinion mailed Apr. 16, 2007 in PCT application PCT/SE2006/050634.

3GPP TS 25.435 V6.2.0 (Jun. 2005), 3rd Generation Partnership Project; Technical Specification Group Radio Access Network; UTRAN $I_{ub}$ Interface User Plane Protocols for Common Transport Channel Data Streams (Release 6).

3GPP TS 25.425 V6.2.0 (Jun. 2005), 3rd Generation Partnership Project; Technical Specification Group Radio Access Network; UTRAN Iur interface user plane protocols for Common Transport Channel data streams (Release 6).

3GPP TS 45.010 V6.6.0 (Nov. 2005), 3rd Generation Partnership Project; Technical Specification Group GSM/EDGE Radio Access Network; Radio Subsystem Synchronization (Release 6).

3GPP TS 25.402 V6.3.0 (Jun. 2005), 3rd Generation Partnership Project; Technical Specification Group Radio Access Network; Synchronisation in UTRA Stage 2 (Release 6).

3GPP TS 25.215 V6.3.0 (Jun. 2005), 3rd Generation Partnership Project; Technical Specification Group Radio Access Network; Physical Layer—Measurements (FDD) (Release 6).

U.S. Office Action mailed Sep. 2, 2009 in corresponding U.S. Appl. No. 11/617,792.

U.S. Final Office Action mailed Oct. 30, 2010 in U.S. Appl. No. 11/617,792.

* cited by examiner

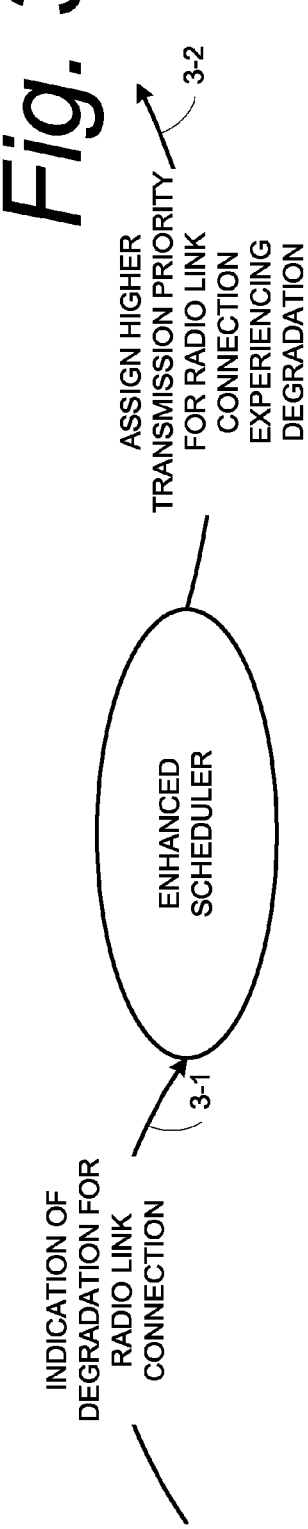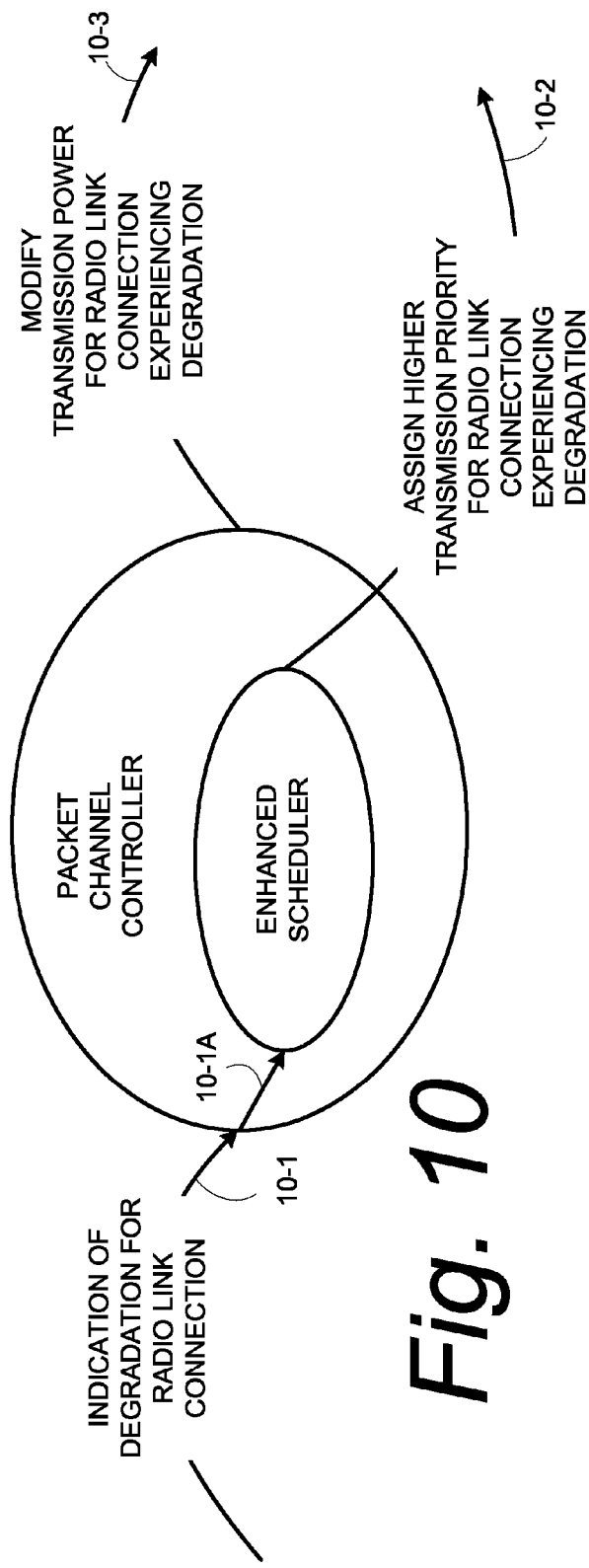

ENHANCING COVERAGE FOR HIGH SPEED DOWNLINK PACKET ACCESS (HSDPA) CHANNEL

This application claims the benefit and priority of U.S. provisional patent application 60/806,432, filed Jun. 30, 2006, entitled "ENHANCING COVERAGE FOR HIGH SPEED DOWNLINK PACKET ACCESS (HSDPA) CHANNEL", is related to simultaneously filed U.S. patent application Ser. No. 11/617,792, entitled "ENHANCED PACKET SERVICE FOR TELECOMMUNICATIONS", both of which are incorporated by reference herein in their entirety.

BACKGROUND

I. Technical Field

The present invention pertains generally to telecommunications, and particularly to a High Speed Downlink Packet Access (HSDPA) system such as that operated (for example) in a Universal Mobile Telecommunications System (UMTS) terrestrial radio access network (UTRAN).

II. Related Art and Other Considerations

In a typical cellular radio system, mobile terminals (also known as mobile stations and mobile user equipment units (UEs)) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology.

As wireless Internet services have become popular, various services require higher data rates and higher capacity. Although UMTS has been designed to support multi-media wireless services, the maximum data rate is not enough to satisfy the required quality of services.

In a forum known as the Third Generation Partnership Project (3GPP), telecommunications suppliers propose and agree upon standards for third generation networks and UTRAN specifically, and investigate enhanced data rate and radio capacity. One result of the forum's work is the High Speed Downlink Packet Access (HSPA). The High Speed Packet Access (HSPA) enhances the WCDMA specification with High Sped Downlink Packet Access (HSDPA) in the downlink and Enhanced Dedicated Channel (E-DCH) in the uplink. These new channels are designed to support IP based communication efficiently, providing enhanced end-user performance and increased system capacity. Though originally designed for interactive and background applications, they provide as good or even better performance for conversational services than the existing CS bearers.

Concerning High Speed Downlink Packet Access (HSDPA) generally, see, e.g., 3GPP TS 25.435 V6.2.0 (2005 June), 3rd Generation Partnership Project; Technical Specification Group Radio Access Network; UTRAN $I_{ub}$ Interface User Plane Protocols for Common Transport Channel Data Streams (Release 6), which discusses High Speed Downlink Packet Access (HSDPA) and which is incorporated herein by reference in its entirety. Also incorporated by reference herein as being produced by the forum and having some bearing on High Speed Downlink Packet Access (HSDPA) or concepts described herein include: 3GPP TS 25.425 V6.2.0 (2005 June), 3rd Generation Partnership Project; Technical Specification Group Radio Access Network; UTRAN Iur interface user plane protocols for Common Transport Channel data streams (Release 6); and 3GPP TS 25.433 V6.6.0 (2005 June), 3rd Generation Partnership Project; Technical Specification Group Radio Access Network; UTRAN Iub interface Node B Application Part (NBAP) signaling (Release 6).

High Speed Downlink Packet Access (HSDPA) is also discussed in one or more of the following (all of which are incorporated by reference herein in their entirety):

U.S. patent application Ser. No. 11/024,942, filed Dec. 30, 2004, entitled "FLOW CONTROL AT CELL CHANGE FOR HIGH-SPEED DOWNLINK PACKET ACCESS";

U.S. patent application Ser. No. 10/371,199, filed Feb. 24, 2003, entitled "RADIO RESOURCE MANAGEMENT FOR A HIGH SPEED SHARED CHANNEL";

U.S. patent application Ser. No. 11/292,304, filed Dec. 2, 2005, entitled "Flow Control For Low Bitrate Users On High-Speed Downlink";

PCT Patent Application PCT/SE2005/001247, filed Aug. 26, 2005; and

PCT Patent Application PCT/SE2005/001248, filed Aug. 26, 2005.

HSDPA achieves higher data speeds by shifting some of the radio resource coordination and management responsibilities to the base station from the radio network controller. Those responsibilities include one or more of the following (each briefly described below): shared channel transmission, higher order modulation, link adaptation, radio channel dependent scheduling, and hybrid-ARQ with soft combining.

In shared channel transmission, radio resources, like spreading code space and transmission power in the case of CDMA-based transmission, are shared between users using time multiplexing. A high speed-downlink shared channel is one example of shared channel transmission. One significant benefit of shared channel transmission is more efficient utilization of available code resources as compared to dedicated channels. Higher data rates may also be attained using higher order modulation, which is more bandwidth efficient than lower order modulation, when channel conditions are favorable.

The radio base station monitors for the channel quality (CQ) of the high-speed downlink shared channel (HS-DSCH) and manages a priority queue maintained at the radio base station. The base station's priority queue (PQ) stores data which is to be sent on the high-speed downlink shared channel (HS-DSCH) over the air interface to the mobile terminal. In addition, knowing from the monitor the carrier quality of the HS-DSCH, the base station sends to the control node messages which authorize the control node to send more HS-DSCH data frames to the radio base station.

The mobile terminal reports a channel quality indicator (CQI) to the radio base station in charge of the cell. The CQI is a measure of the quality of the common pilot CPICH as reported by each mobile station (e.g., each user equipment unit ("UE")). The channel quality indicator (CQI), together with an expression(s) of capabilities of the mobile terminal, is translated to a bitrate. The bitrate is then further reduced if needed by the radio base station, which results in generation of capacity allocation control frames which are sent to the control node regularly and/or per need bases, e.g. at urgent transitions. The authorizing messages include a "capacity allocation" which can be expressed in various ways, such as in terms of either bitrate or credits, for example. For example, capacity allocation expressed in credits may refer to a number of MAC-d PDUs that the radio network controller (RNC) is allowed to transmit for the MAC-d flow. In response to these authorizing messages, the control node sends further HS-DSCH frames to the radio base station.

The data in the priority queues is sent from a control node to a radio base station in protocol data units (PDUs). A number of PDUs may be included in each high-speed downlink shared channel (HS-DSCH) data frame.

Thus, HSDPA is a shared channel designed for efficient support of packet data applications. Enhancements over dedicated (and shared) channels include fast link adaptation; fast scheduling; Hybrid ARQ from Node B; and a short transmission time interval (TTI). In terms of fast link adaptation, the link adaptation is done by selecting the best modulation and coding scheme based on channel quality indicator from the UE. For fast scheduling, the selection of the user is done in the Node B, which has access to the link quality information, and thus can select the optimal user. Hybrid ARQ from Node B involves having a retransmission mechanism in the base station which allows fast retransmissions and quick recovery of erroneous link adaptation decisions. As a short TTI, a two millisecond (ms) TTI is used for all transmissions.

E-DCH is a dedicated channel that has been enhanced for IP transmission. Enhancements include the possibility of using use a shorter TTI; fast hybrid ARQ (HARQ) between mobile terminal and the base station; scheduling of the transmission rates of mobile terminals from the base station; and the fact that E-DCH retains majority of the features characteristic for dedicated channels in the uplink. In terms of fast hybrid ARQ (HARQ) between mobile terminal and the base station, the HARQ mechanism is semi-persistent, as it will abandon a transmission after a fixed number of transmission attempts. The number of transmission attempts is signaled from the RNC to the UE.

Base stations provided with high-speed downlink packet access capability typically have a high-speed downlink packet access controller, e.g., a HSDPA scheduler or similar channel manager that governs allocation and utilization of the high-speed downlink shared channel (HS-DSCH) and a high-speed shared control channel (HS-SCCH) which is utilized for signaling purposes. The HSDPA controller is commonly referred to also as HSDPA scheduler. The HS-SCCH contains information which is sent to the mobile terminals so that the mobile terminals know if they have data to receive on the HS-PDSCh channel or not. The high-speed downlink shared channel (HS-DSCH) and the high-speed shared control channel (HS-SCCH) are separate channels. As understood by those skilled in the art, the signaling carried by the high-speed shared control channel (HS-SCCH) is performed by transmitting the HS-SCCH TTI two slots in advance of the corresponding HS-DSCH TTI.

One example HSDPA scheduler executes an algorithm for determining scheduling priority for each user, e.g., each user equipment unit (UE). The scheduling priority algorithm receives two primary inputs. Separate priority factors for the scheduling priority algorithm are computed for each of these two primary inputs, and are multiplied together.

A first input to the scheduling priority algorithm is related to a time delay for a packet; the second input is related to a channel quality index (CQI).

The first input to the scheduling priority algorithm is the time delay parameter for a packet residing in a transmission buffer of the base station node and destined for the user equipment unit (UE). This first input results in a priority delay factor, which is computed by passing the time remaining until the packet is too old to a barrier function. For example, the delay factor can be computed as 1/timeLeft ("timeLeft" being the time left in the buffer), with a maximum delay factor of 100 being permitted, which results in the curve of FIG. 1A. As shown in FIG. 1A, when time left, i.e. when the remaining time before the packet is dropped is 50 ms the delay factor is 20.

This time delay parameter can be related to or a function of several other parameters, and preferably four parameters a, b, t1, and t2. FIG. 1B shows a parameterized function for the time delay parameter, and illustrates that parameters t1 and t2 are limits on the time left scale (i.e., describing when to change the slope of the curve), and parameters a and b are parameters that define the slope for the first part of the barrier function. Therefore, the delay factor is computed as a function of the timeLeft, i.e timeleft=Threshold−TimeInQueue, as described by Expression 1:

$$f(timeLeft) = \begin{cases} -b(timeLeft - t_1) & \text{for } timeLeft < t_1 \\ (timeLeft - t_2)^2 \dfrac{a-1}{(t_1 - t_2)^2} + 1 & \text{for } t_1 \le timeLeft < t_2 \\ 1 & \text{for } t_2 \le timeLeft \end{cases}$$

When the packet is delayed up to a delay threshold time ($d_{th}$), the packet is discarded. The delay based priority function is illustrated in FIG. 1B.

The second input to the scheduling priority algorithm is related to a channel quality index (CQI), i.e. the measured and reported CQI, or simply the Carrier to Interference Ratio (CIR). The channel quality index (CQI) priority factor is the current reported CQI divided with low pass filtered previous reported CQI or simply average CQI.

For a successful cellular service, a number of considerations are involved. One such consideration is area coverage, e.g., geographical coverage. Of concern in service provision and network design is the fact that a user equipment unit (UE) may suffer from degrading radio coverage, particularly near a cell border or coverage "hole" within a cell.

What is needed therefore, and an object of the present invention, are apparatus, methods, and techniques for enhancing cellular service, and in particular HSDPA coverage, in a telecommunications system.

BRIEF SUMMARY

The technology concerns a High Speed Downlink Packet Access (HSDPA) channel which exists over an air interface between a base station node and a user equipment unit. One aspect of the technology involves a method of operating the base station node. The method comprises obtaining an indication of degradation of a radio link connection, e.g. a degrading channel quality indicator/index (CQI), between the base station node and the user equipment unit (UE) which is carried by the channel; and, in accordance with the distance indication, modifying transmission priority for the radio link connection. Preferably the indication of degradation is a distance indication or CQI of the user equipment unit (UE) involved in the radio link connection from the base station node. The transmission priority can be modified for one or both of downlink and uplink transmissions for the user equipment unit (UE), e.g., in enhanced uplink scheduling. Preferably the transmission priority is modified for the radio link connection, e.g., for the user equipment unit (UE), as a function of the indication.

In a first example mode and embodiment, a MAC-hs scheduler of the base station node determines a nominal transmission priority value for the radio link connection (e.g., for the user equipment unit (UE) involved in the radio link connection) by using a first input and a second input. The first input is related to a time delay for a packet, the packet residing in a transmission buffer of the base station node and being destined for transmission on the radio link connection to the user equipment unit (UE). The second input is related to a channel quality index (CQI). The MAC-hs scheduler modifies the nominal transmission priority value with a third input, the third input being related to the indication.

In a second example mode and embodiment, a MAC-hs scheduler of the base station node uses plural parameters for determining a time delay parameter. The time delay parameter is an indication of delay for a packet residing in a transmission buffer of the base station node, the packet being destined for transmission on the radio link connection to the user equipment unit (UE). In the second example mode, the MAC-hs scheduler adjusts a value of at least one of the plural parameters using the indication to form an adjusted time delay and uses the adjusted time delay to determine a modified transmission priority for the radio link connection.

In an example implementation of the second example mode and embodiment, a set of distance ranges from the base station node is established. The MAC-hs scheduler adjusts the value of the at least one of the plural parameters based on an associated distance range of the set in which the user equipment unit (UE) involved in the radio link connection belongs. The at least one of the plural parameters can be any one or more of the following: a, b, t1, t2, and $d_{th}$, as well as the delay threshold which determines the timeLeft parameter. With this, one could give users with "bad" radio link connections longer time in the queue to transmit data. However, one must be careful because increasing the delay threshold may have the opposite effect on system capacity, i.e. it may go down as really bad radio link connection may be up but still very little data gets through, and hence waste shared resources. Further, one could also adjust the CQI priority factor inversely, i.e. increasing CQI gives less priority.

In the first and second modes and embodiments, the indication can be obtained in accordance with differing implementations. For example, in a first example distance acquisition example, the indication is obtained from a transmission Timing Advance (TA) for the user equipment unit (UE) involved in the radio link connection. In a second example distance acquisition example, the indication is obtained from a Carrier to Interference Ratio (CIR) report for the user equipment unit (UE) involved in the radio link connection.

As an addition or adjunct to either the first mode and embodiment or the second mode and embodiment, the base station node can also modify transmission power to obtain a modified transmission power to be used for the radio link connection on the channel, the modified transmission power being modified in accordance with the indication. For example, the implementation can modify the transmission power for the radio link connection (e.g., for the user equipment unit involved in the radio link connection) as a function of the indication.

As a further addition or adjunct to either the first mode and embodiment or the second mode and embodiment, the modified transmission power can be used to determine an order for the radio link connection within a transmission time interval.

Another aspect of the technology concerns a base station node, e.g., a Node-B, of a telecommunications system. The base station node transmits a downlink High Speed Downlink Packet Access (HSDPA) channel over an air interface between the base station node and a user equipment unit. The base station node comprises a transceiver for transmitting on the HSDPA channel, as well as a scheduler for modifying transmission priority for the radio link connection in accordance with a degradation indication. The degradation indication can be a distance indication of distance of the user equipment unit (UE) involved in the radio link connection from the base station node. The base station node can be configured and arranged to implement techniques, features, and characteristics already summarized above.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a diagrammatic view showing general, representative, example actions performed by and in conjunction with an enhanced scheduler of a base station node for ensuring satisfactory operation of a packet channel.

FIG. 10 is a diagrammatic view showing general, representative, example actions performed by and in conjunction with the packet channel controller of FIG. 9.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1A:
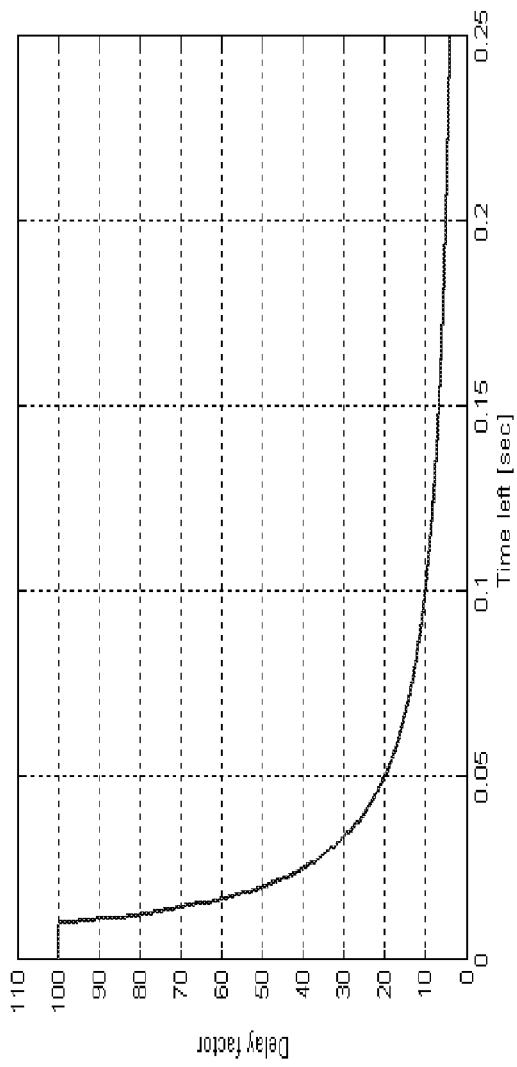
FIG. 1A is a graph showing a parameterized function for the time delay parameter.
Figure 1B:
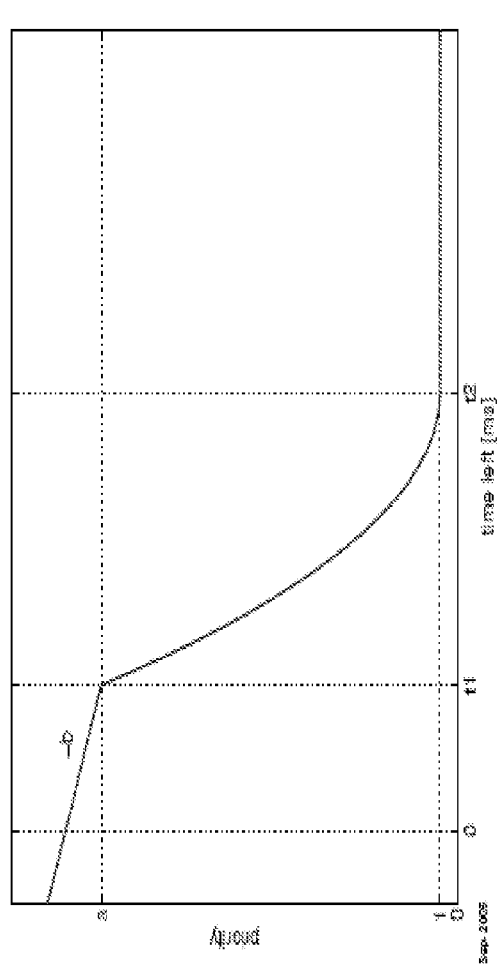
FIG. 1B is a graph showing a delay based priority function for a conventional HSDPA channel.
Figure 2:
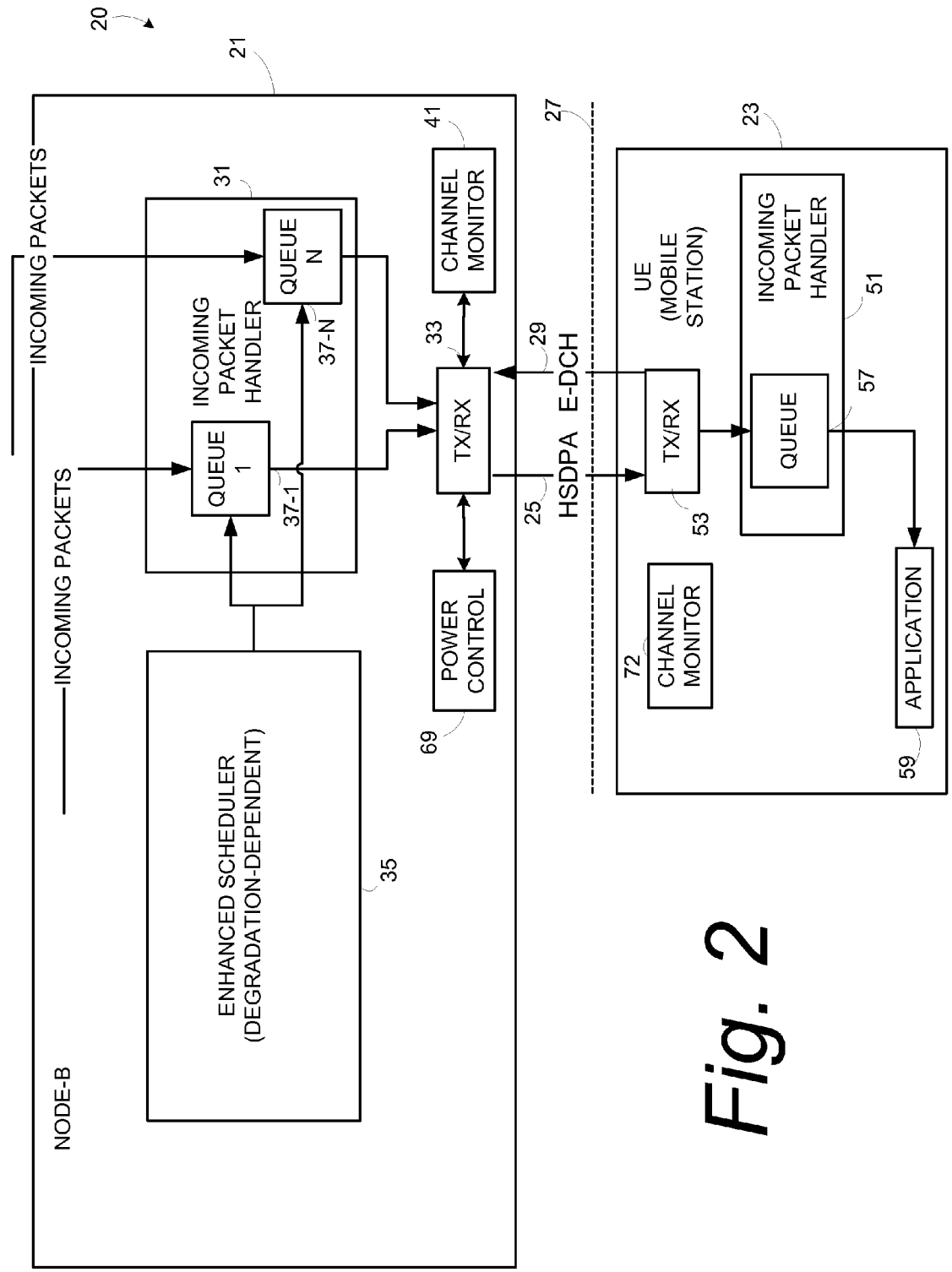
FIG. 2 is a schematic view of an example telecommunications system, including both a transmitting node and a receiving node, and wherein the transmitting node includes a packet service enhancer in conjunction with a packet channel.

Basic aspects of an example generic embodiment of the technology are illustrated in by the telecommunications system 20 shown in FIG. 2. For sake of clarity, telecommunications system 20 is shown as simply comprising a base station node (e.g., Node-B) 21 and a wireless node in the form of user equipment unit (UE) 23. The telecommunications system 20 is configured so that at least one downlink packet channel 25 exists over an air interface 27 between base station node 21 and user equipment unit (UE) 23. In addition, one or more uplink packet channels, such as uplink packet channel 29 is transmitted in a second direction across air interface 27 (e.g., from user equipment unit (UE) 23 to base station node 21). Preferably, the downlink packet channel 25 is a High Speed Downlink Packet Access (HSDPA) channel and the uplink packet channel 29 is an E-DCH channel.

To the extent here pertinent, base station node 21 is shown as including a packet handler 31; one or more transceiver(s) 33; and an enhanced scheduler functionality or unit 35. The packet handler 31 includes plural packet queues 37-1 through 37-N into which packets incoming to base station node 21 from separate packet flows are stored. Each queue 37 can be associated with a separate user equipment unit (UE) utilizing the HSPDA channel(s) 25, or a separate radio link connection utilizing the HSPDA channel(s) (since a single user equipment unit (UE) may have more than one radio link connection). The base station node 21 further includes channel monitor 41 and power controller 69.

The enhanced scheduler 35 determines a priority for each equipment unit (UE), or each radio link connection, utilizing the HSPDA channel(s). For example, if enhanced scheduler 35 determines that a equipment unit (UE) or a radio link connection has a higher transmission priority, such equipment unit (UE) or radio link connection is given preferential scheduling (e.g., preferential assignment of resources) on the HSPDA channel(s). As utilized hereinafter, reference to a user equipment unit (UE) also encompasses reference to a radio link connection involving a user equipment unit (UE), and vise versa. Accordingly, what is modified is the priority that a nodeB should transmit data to a given user equipment unit over a certain radio link connection, among other UEs that the nodeB also should send data to using a shared resource (HS-DSCH) which the radio links are part of or take resources from.

In order to represent the priority assigned to each radio link connection, enhanced scheduler 35 is shown in FIG. 2 as having an output signal applied to the packet queues 37 for the respective radio link connections represented by those queues. For simplicity of illustration, the priority signal applied to each packet queue 37 represents the gating of contents from the respective packet queue 37 in accordance with the scheduling priority afforded by enhanced scheduler 35. Those skilled in the art will appreciate other actions which may be involved for implementation of the scheduling beyond the gating of packets from a queue.

Advantageously, enhanced scheduler 35 is capable of modifying transmission priority for a user equipment unit (UE) in accordance with an indication of degradation indication (e.g., a "degradation indication") of the radio link connection carried by the packet channel. For this reason, the enhanced scheduler 35 illustrated in FIG. 2 is indicated to be a degradation-dependent scheduler. As explained hereinafter, the degradation indication can be a distance indication of distance of the user equipment unit (UE) from the base station node, which may (for example) be a transmission timing adjustment (TA) and/or channel quality index (CQI).

FIG. 2 shows only one user equipment unit (UE) 23, although it should be understood that base station node 21 typically serves numerous user equipment units (UEs). The example user equipment unit 23 which happens to be shown includes a packet handler 51 and a transceiver 53. The packet handler 51 includes a packet queue 57 into which packets incoming on packet channel 25 to user equipment unit 23 from base station node 21 are stored, and from which packets are extracted for use in an application 59 performed or executed by user equipment unit 23. Such service or application can be, for example, voice over Internet Protocol (VoIP). The user equipment unit (UE) 23 also includes a channel monitor 72.

FIG. 3 shows general, representative, example basic steps or acts performed by enhanced scheduler 35 of base station node 21 for ensuring satisfactory operation of packet channel 25. The steps of FIG. 3 are understood to be performed in conjunction with on-going operation of packet channel 25, e.g., the reception by base station node 21 of packets from a packet source (e.g., an application, such as VoIP); the storing of packets received from the packet source in packet queue 37; transmission of packets stored in packet queue 37 on a radio link across air interface 27 to user equipment unit 23;

reception by user equipment unit 23 of the transmitted packets; and, storage of the packets received by user equipment unit 23 in packet queue 57 for use by application 59.

In essence, FIG. 3 shows as action 3-1 that enhanced scheduler 35 receives (e.g., as a report) or obtains (e.g., by monitoring) an indication of actual or potential degradation of a radio link connection which utilizes the HSDPA packet channel 27. For example, an indication of degradation may be received with respect to a radio link connection with a user equipment unit (UE) which is approaching or coming close to a cell border. As action 3-2, the enhanced scheduler 35 assigns a higher transmission priority for the radio link connection using the HSDPA channel which is experiencing the degradation. For a radio link connection carried by the HSDPA channel for which the enhanced scheduler 35 has an indication of degradation, enhanced scheduler 35 essentially enters an enhancement mode with respect to such radio link connection. As illustrated by ensuing example embodiments and modes, the indication of degradation can be provided to or obtained by enhanced scheduler 35 in various ways, and differing techniques can be implemented for allocating or assigning the higher transmission priority.

Figure 4:
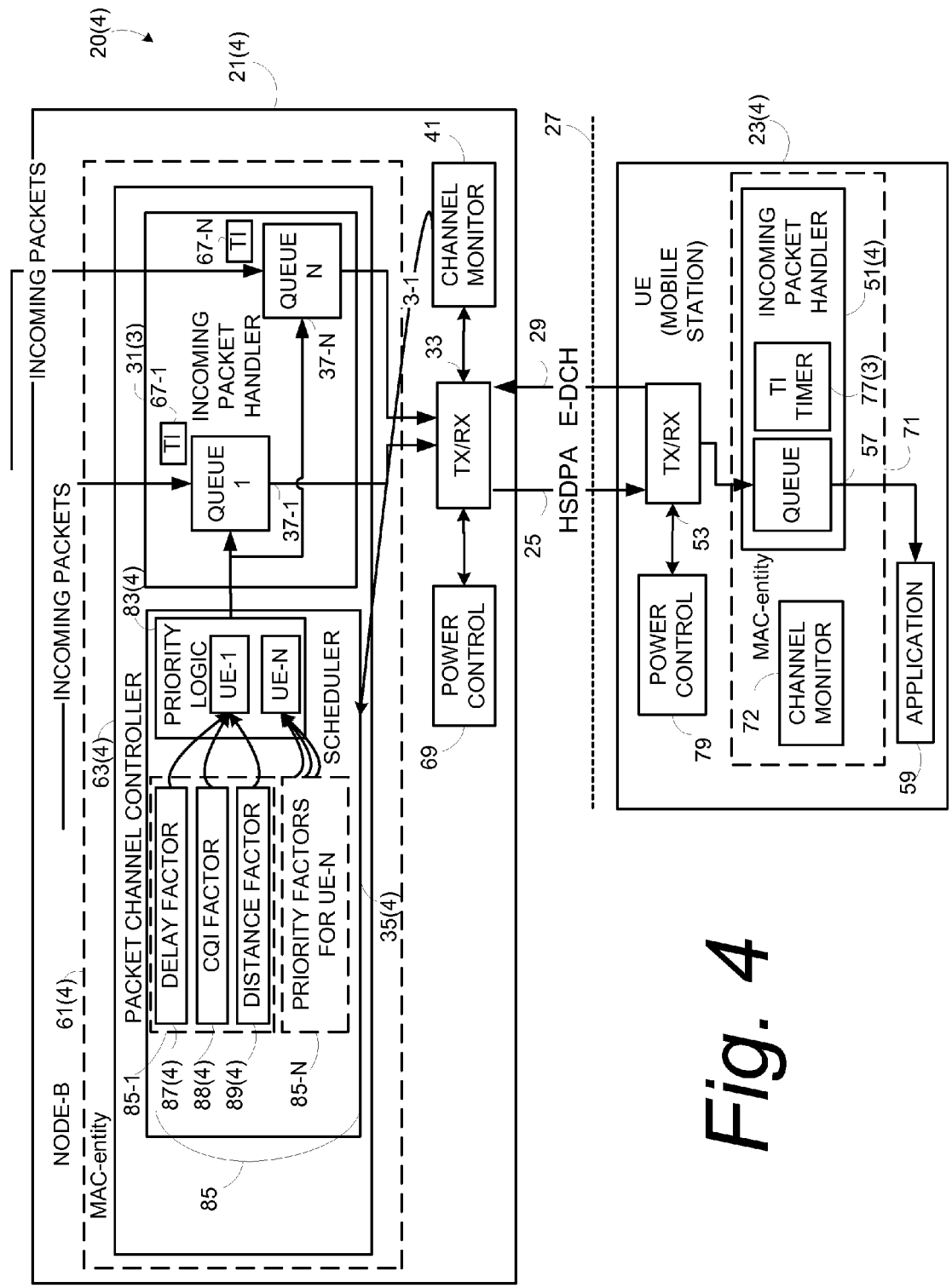
FIG. 4 is a schematic view of an example telecommunications system including a first example embodiment of an enhanced scheduler.

FIG. 4 illustrates an example telecommunications system 20(4) including base station node 21(4) which has a first example embodiment of an enhanced scheduler 35(4). In FIG. 4, packet channel 25 is a High Speed Downlink Packet Access (HSDPA) channel carrying MAC-hs packets from base station node 21(4) to user equipment unit 23(4). Packets carried on the HSDPA channel 25 of FIG. 4 are obtained or formed from incoming packets, e.g., incoming Service Data Units (SDUs). The SDUs each have a sequence number (e.g., a Transmission Sequence Number [TSN]) which can be utilized for re-ordering the incoming SDUs in case they are not received in TSN order.

In the FIG. 4 embodiment, transmitting Node-B 21(4) includes a MAC entity 61(4). The MAC entity 61(4) of Node-B 21(4) hosts or includes both packet channel controller 63(4) and enhanced scheduler 35(4). The enhanced scheduler 35(4) can be included in, or work in conjunction with, packet channel controller 63(4). The packet handler 31(4), in addition to comprising packet queues 37-1 through 37-N, also comprises T1 timers 67-1 through 67-N respectively associated with packet queues 37-1 through 37-N. Each T1 timer 67 is initialized by detecting a missing PDU (e.g., by receiving a next PDU after a missing PDU) with respect to the packet flow associated with its queue and is corresponding radio link connection. In addition, Node-B 21(4) includes power control unit 69 which serves to control the power applied to or utilized by transceiver(s) 33.

The user equipment unit 23(4) of FIG. 4 preferably also includes a MAC entity (shown as MAC entity 71(4)). As is well known, MAC-hs is a medium access control (MAC) protocol residing in the NodeB of a WCDMA/UMTS cellular system. The MAC entity 71(4) of UE 23(4) hosts enhanced scheduler 35(4), packet handler 51(4), and (optionally) channel monitor 72 as well. The enhanced scheduler 35(4) can also be viewed as a unit or logic which performs or executes a MAC-HS scheduling algorithm. The packet handler 51(4) includes, in addition to packet queue 57(4), its own T1 timer 77(4). UE 23(4) includes a power control unit 79 which serves to control the power applied to or utilized by its transceiver 53.

FIG. 4 also illustrates example constituent functionalities of enhanced scheduler 35, including priority logic/unit 83(4) and a set 85 of priority factor memory registers or locations. The priority logic/unit 83(4) executes or performs the transmission priority calculation for each radio link connection, represented by each radio link connection's associated packet queue 37 in FIG. 4. For example, for radio link connection "x" having packet queue 37-x, enhanced scheduler 35 makes a separate calculation or determination of transmission priority. The transmission priority calculation or determination performed by enhanced scheduler 35(4) utilizes priority factors. For the first radio link connection handled by enhanced scheduler 35(4), set 85 includes a subset of priority factors 85-1; for the Nth radio link connection handled by enhanced scheduler 35(4), set 85 includes a subset priority factors 85-N; and so on for each radio link connection between the first and $N^{th}$ connections.

The enhanced scheduler 35(4) of the FIG. 4 embodiment utilizes three priority factors for its calculation/determination of transmission priority for a radio link connection carried over the HSDPA channel 25. As understood from the foregoing, each radio link connection carried by the HSDPA channel has its own subset of priority factors, stored in memory 85. FIG. 4 particularly illustrates the three priority factors for the first radio link connection: delay factor 87(4); CQI factor 88(4); and distance factor 89(4). The enhanced scheduler 35(4) has the three same type factors for each radio link connection carried by HSDPA channel, although the factor values for each radio link connection may and likely do differ from connection to connection.

In the FIG. 4 embodiment, the delay factor 87(4) and the CQI factor 88(4) are essentially the same type factors as conventionally employed. That is, the delay factor 87(4) can be computed by passing the time remaining until the packet is too old to a barrier function, and can be related to or a function of several other parameters, and preferably parameters a, b, t1, and t2, and even dth, as previously discussed. As also previously mentioned, the CQI factor 88(4) can be a modified max Common Indexing Protocol (CIR) calculation, in which CQI is divided with low-pass filtered measurement of CQI.

The FIG. 4 embodiment differs from conventional technology by, among other things, utilizing a third priority factor which is dependent upon or reflective of a degree of degradation experienced by the radio link connection whose transmission priority is being calculated or assessed. In the particular mode illustrated in FIG. 4, this degradation indicative factor is a distance indication of a distance of the user equipment unit (UE) involved in the radio link connection from the base station node 21 whereat the enhanced scheduler 35(4) resides. Accordingly, because of its example derivation, in FIG. 4 this third factor is labeled as the "distance factor".

The delay factor 87(4) is also represented herein as pdelay; the CQI factor 88(4) is also represented herein as pCQI; the distance factor 89(4) is also represented herein as pDISTANCE. As explained above, this third factor, distance factor 89(4) or pDISTANCE, can be a function of distance between the user equipment unit (UE) and the base station node 21. As such, in the FIG. 4 embodiment, enhanced scheduler 35(4) adds the third input, i.e., the third factor indicative of degradation (e.g., distance), and therefore computes or determines priority (P) (as action 3-2 in FIG. 3) in accordance with Expression 2.

$$P = p_{delay} * p_{CQI} * p_{DISTANCE} \qquad \text{Expression 2}$$

Figure 5:
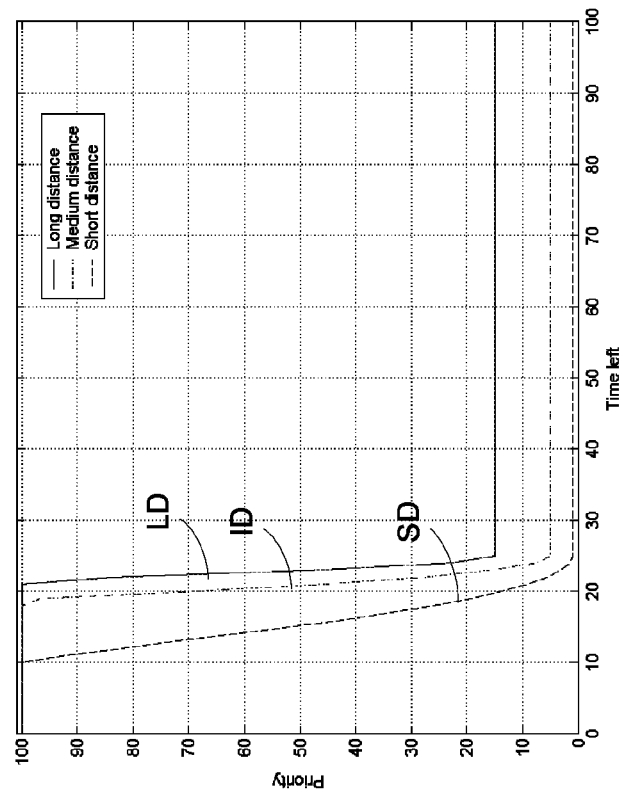
FIG. 5 is a graph showing example transmission priority determinations made by the enhanced scheduler of FIG. 4.

FIG. 5 is a graph showing transmission priority determinations made by the enhanced scheduler 35(4) of FIG. 4, using a priority determination of the type of Expression 2, for three different radio link connections, e.g., for three different user equipment units. In FIG. 5, the curve LD represents transmission priority for a user equipment unit (UE) located at a long distance from base station node 21(4); the curve SD represents transmission priority for a user equipment unit (UE) located at a short distance from base station node 21(4); and, the curve ID represents transmission priority for a user equipment unit (UE) located at an intermediate distance from base station node 21(4). From another perspective, LD can mean a "bad quality" channel; ID can mean a "medium quality" channel"; and SD can mean a "Good quality channel". The ordinate axis in FIG. 5 is time left, which is the time left before the packet will be dropped, i.e., timeLeft=Threshold−TimeInQueue. The less "time left" (before the packet will be dropped TimeInQueue>=threshold) gives higher priority. The abscissa in FIG. 5 corresponds to increasing priority.

As mentioned above, for the FIG. 4 embodiment the third factor, e.g., distance factor 89(4) or pDISTANCE, can be a function of distance between the user equipment unit (UE) and the base station node 21. The distance can be acquired by looking at the transmission Timing Advance (TA) and/or the Carrier to Interference Ratio (CIR) reports or CQI reports. For example, the TA and/or CIR reports can be weighted with a function FDISTANCE(TA, CIR) to form the distance factor 89(4) or pDISTANCE. The function FDISTANCE can take various forms, but should increase with the distance (e.g., for example, exponentially increase with distance). It could also be scaled linearly and take as input also the number of user or radio connections that are to be scheduled this time-period, transmission time interval (TTI).

Figure 6:
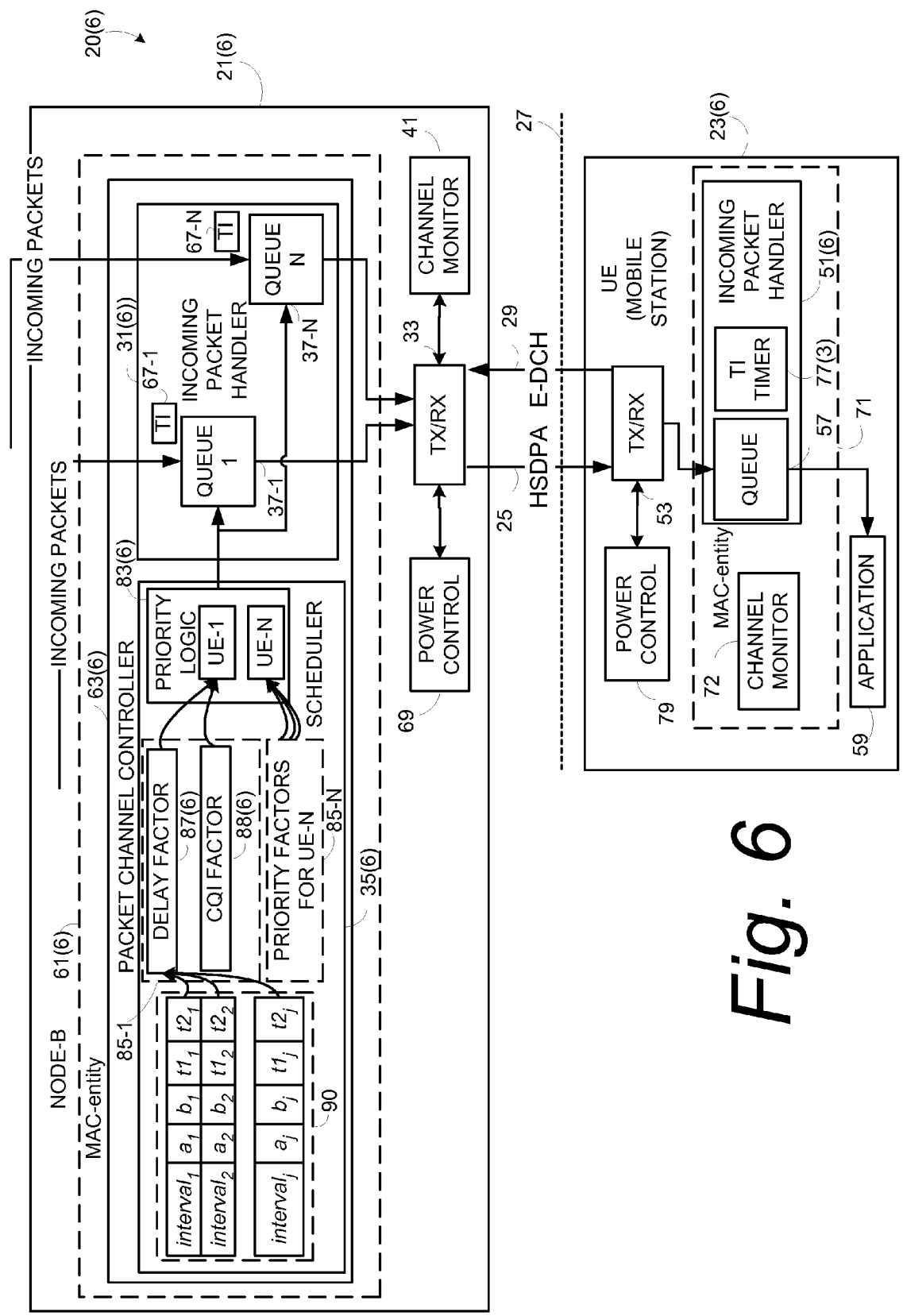
FIG. 6 is a schematic view of an example telecommunications system including a second example embodiment of an enhanced scheduler.

FIG. 6 illustrates an example telecommunications system 29(4) including base station node 21(6) which has a second example embodiment of an enhanced scheduler 35(6). The enhanced scheduler 35(6) of the FIG. 6 embodiment primarily differs from enhanced scheduler 35(4) of the FIG. 4 embodiment in they way in which the transmission priority is computed for each radio link connection. Instead of adding a new priority factor as input to its priority logic/unit 83(6) [such as a new distance factor], the enhanced scheduler 35(6) instead changes the delay factor 87(6) for the radio link connection by altering one or more of the constituent parameters for the delay factor 87(6). Such parameters that are subject to change are those aforementioned, e.g., the a, b, t1, t2, and delay threshold time ($d_{th}$).

In the FIG. 6 embodiment, the change(s) of the constituent parameter(s) for delay factor 87(6) are based on the distance between base station node 21 and user equipment unit (UE) 23 involved in the radio link connection suffering the degradation. To this end, FIG. 6 shows that values for the parameters constituting the delay factor 87(6) are dependent upon into which of plural potential distance intervals the user equipment unit (UE) for the radio link connection is classified. In other words, the distance separating a user equipment unit (UE) from the base station node 21 is the criteria by which the user equipment unit (UE), and thus the radio link connection in which the user equipment unit (UE) is participating, is classified into one of the plural distance intervals. For example, FIG. 6 shows the cell as having j number of distance intervals, the nearest interval (for those user equipment units closest to base station node 21) being interval$_1$, the farthest interval (for those user equipment units most remote from base station node 21) being interval$_j$. If a user equipment unit (UE) is classified in distance interval$_1$, the delay factor for the transmission priority calculation is determined by the parameter values associated with distance interval$_1$ For example, if the user equipment unit (UE) participating in the first radio link connection is classified (based on its distance) as being in distance interval$_1$, then the delay factor 87(6) for that radio link connection is a function of the parameters $a_1$, $b_1$, $t1_1$, and $t2_1$ which are associated with the first distance interval$_1$. On the other hand, if the user equipment unit (UE) is at or near a cell border, for example, the delay factor 87(6) for that radio link connection is a function of the parameters $a_j$, $b_j$, $t1_j$, and $t2_j$ which are associated with the most remove distance interval$_j$.

Figure 7:
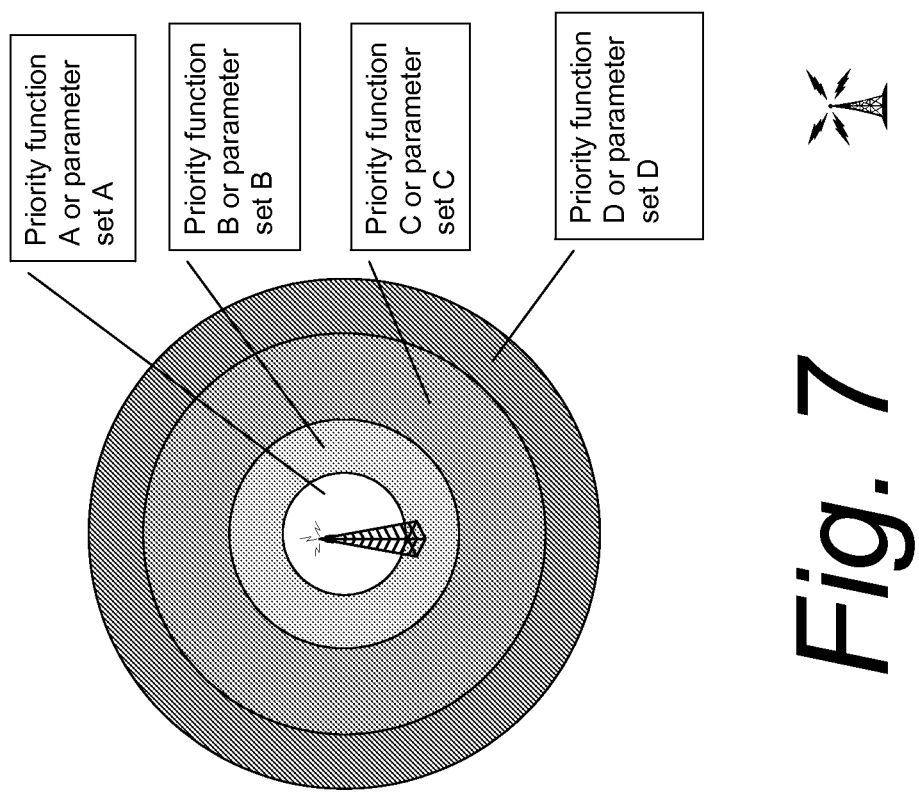
FIG. 7 is a diagrammatic view of a cell showing zones of transmission priority.

Thus, in one example implementation, for the FIG. 6 embodiment there is a specific priority function per distance interval group. Hence, depending on the distance, a user equipment unit (UE) is given its transmission priority calculated from the priority function assigned for that particular interval. For example, FIG. 7 shows an example cell conceptualized as having concentric zones or areas of coverage. The central most zone is associated with a priority function A or parameter set A; a second most central zone is associated with a priority function B or parameter set B; and so forth extending out to an outermost zone which is associated with a priority function D or parameter set D. The number of distance groups, e.g., the number of distance intervals, is an implementation choice.

Into which distance interval a user equipment unit (UE) falls can be determined by looking at the transmission Timing Advance (TA) and/or the Carrier to Interference Ratio (CIR) reports or CQI reports, in like manner as with the first example embodiment.

Figure 8:
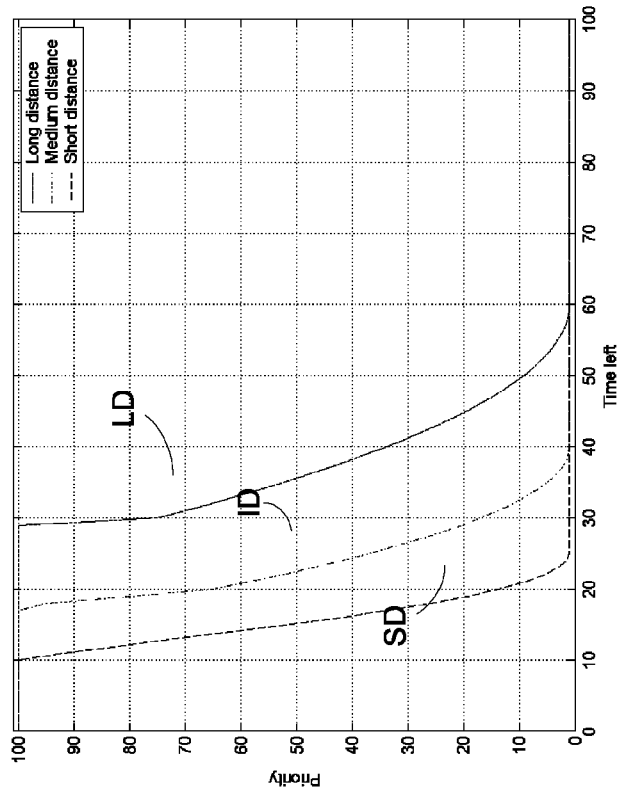
FIG. 8 is a graph showing example transmission priority determinations made by the enhanced scheduler of FIG. 6.

FIG. 8 is a graph showing transmission priority determinations made by the enhanced scheduler 35(6) of FIG. 6, using a priority determination of the type just explained (e.g., with distance intervals), for three different radio link connections, e.g., for three different user equipment units. In FIG. 8, the curve LD represents transmission priority for a user equipment unit (UE) located at a long distance from base station node 21(6); the curve SD represents transmission priority for a user equipment unit (UE) located at a short distance from base station node 21(6); and, the curve ID represents transmission priority for a user equipment unit (UE) located at an intermediate distance from base station node 21(6). Like with FIG. 5, from another vantage point LD can also mean a "bad quality" channel; ID can mean a "medium quality" channel"; and SD can mean a "Good quality channel". The ordinate axis in FIG. 8 is time left. The abscissa in FIG. 8 corresponds to increasing priority.

The enhanced schedulers 35 as described herein may be implemented using individual hardware circuits, using software programs and data in conjunction with one or more suitably programmed digital microprocessors or general purpose computers, using application specific circuitry (ASIC), and/or using one or more digital signal processors (DSPs). Various other functionalities of enhanced scheduler 35 and HSDPA-related entities of the base station node 21 not described herein are understood with reference to U.S. patent application Ser. No. 11/024,942, filed Dec. 30, 2004, entitled "FLOW CONTROL AT CELL CHANGE FOR HIGH-SPEED DOWNLINK PACKET ACCESS"; which is incorporated herein by reference.

As mentioned in conjunction with the description of the first and second modes and embodiments, the indication of degradation represented by action 3-1 of FIG. 3 can be obtained in accordance with differing implementations. For example, in a first example distance acquisition example, the indication is obtained from a transmission Timing Advance (TA) for the user equipment unit (UE). In a second example distance acquisition example, the indication is obtained from a Carrier to Interference Ratio (CIR) report for the user equipment unit (UE). To this end, FIG. 4 shows the indication of degradation represented by action 3-1 as being obtained from channel monitor 41.

As known in the art, a transmission Timing Advance (TA) is obtained from measurements at the physical layer. The user equipment units transmit a sequence of symbols, referred to as the training sequence, which is captured by the node-B/base station. Through the training sequence, The node-B can synchronize with the user equipment unit, and sends a timing advance (TA) to the user equipment unit. The use of transmission Timing Advance (TA) is described, e.g., in GERAN SUBSYSTEM: 3GPP TS 45.010 V6.6.0 (2005 November), WCDMA: 3GPP TS 25.402 V6.3.0 (2005 June), which is incorporated herein by reference in its entirety.

The CIR (reports) are also obtained from measurements at the physical layer. The CIR reports are part of the 3GPP WCDMA release 6 standard. See, e.g., 3GPP TS 25.215, noting that SIR is related to CIR (e.g., SIR=gain*CIR).

In some implementations, the second embodiment and mode which involves a distance dependent delay priority function may be preferable, compared to the first embodiment and mode of adding a separate and new distance priority factor, may better utilize the CIR tops thanks to a higher resolution gained by changing parameters of the delay priority function.

As an addition or adjunct to either the first mode and embodiment or the second mode and embodiment, the base station node can also modify transmission power to obtain a modified transmission power to be used for the radio link connection on the channel, the modified transmission power being modified in accordance with the indication. For example, the implementation can modify the transmission power for the radio link connection (e.g., for the user equipment unit involved in the radio link connection) as a function of the indication.

Figure 9:
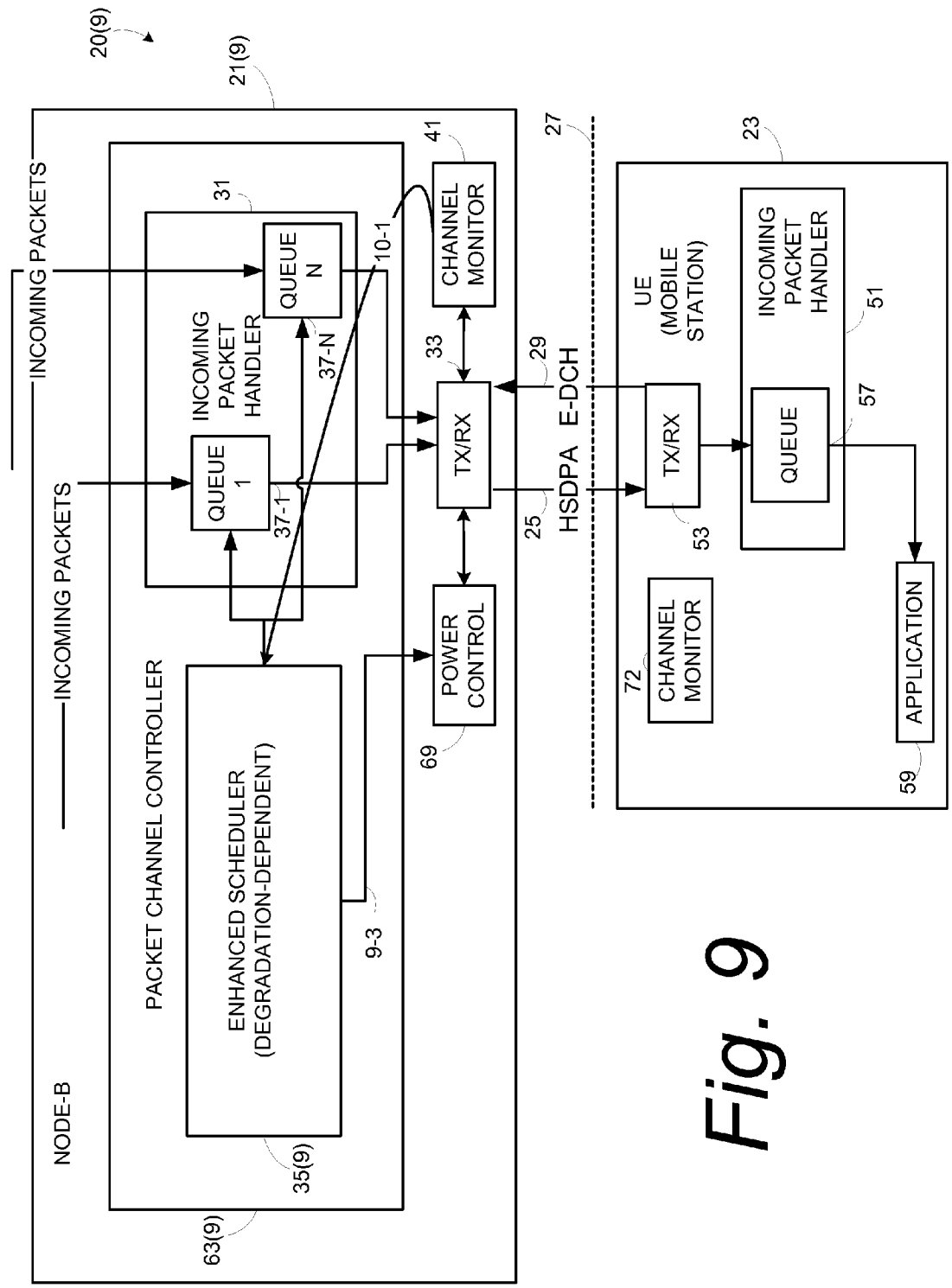
FIG. 9 is a schematic view of an example telecommunications system including a packet channel controller which facilitates not only modification of transmission priority, but also modification of transmission power, for a radio link connection having a degradation indication

FIG. 9 illustrates another example telecommunications system 20(9) which, in representative and generic manner, implements the foregoing modified transmission power aspect. In most respects, base station node 21(9) of FIG. 9 resembles the base station node 21 of FIG. 2. In Fig. the enhanced scheduler 35(9) is shown as being included in packet channel controller 63(9).

FIG. 10 shows general, representative, example basic steps or acts performed by packet channel controller 63(9) and by enhanced scheduler 35(9) of FIG. 9 of base station node 21(9) for ensuring satisfactory operation of packet channel 25. The steps of FIG. 10 are understood to be performed in conjunction with on-going operation of packet channel 25, e.g., on-going steps as previously described.

In essence, FIG. 10 shows as action 10-1 that packet channel controller 63(9) receives (e.g., as a report) or obtains (e.g., by monitoring) an indication of actual or potential degradation of a radio link connection which utilizes the HSDPA packet channel 27. For example, an indication of degradation may be received with respect to a radio link connection with a user equipment unit (UE) which is approaching or coming close to a cell border. As action 10-1A, the degradation indication is referred or otherwise also made available to enhanced scheduler 35(9). As action 10-2, the enhanced scheduler 35(9) assigns a higher transmission priority for the radio link connection using the HSDPA channel which is experiencing the degradation. For a radio link connection carried by the HSDPA channel for which the enhanced scheduler 35(9) has an indication of degradation, enhanced scheduler 35(9) essentially enters an enhancement mode with respect to such radio link connection. As understood from the foregoing example embodiments and modes, the indication of degradation can be provided to or obtained by enhanced scheduler 35 in various ways, and differing techniques can be implemented for allocating or assigning the higher transmission priority. In addition, for the radio link connection carried by the HSDPA channel for which the enhanced scheduler 35(9) has an indication of degradation, as action 10-3 (see both FIG. 9 and FIG. 10) packet channel controller 63(9) assigns or requests a higher transmission power. The action of 10-3 can involve or be packet channel controller 63(9) making and transmitting to power control 69 either a power level for the affected radio link connection, or an additional modification factor to be used by power control 69 as the power control 69 makes its own calculation of the power level for the affected radio link connection.

Thus, in accordance with the embodiment of FIG. 9 and mode of FIG. 10, base station node 21(9) calculates a power level or power factor for each user, e.g., for each radio link connection. As a result of action 10-3, the power factor ($p_{power-distance}$) or the power level is a function of the estimated geographical distance between the user equipment unit (UE) 23 and node-B 21(9). As previously explained, such distance can be acquired by looking at the transmission Timing Advance (TA) and/or the CIR reports.

In one example implementation, when the packet channel controller 63(9) calculates and outputs a power factor ($p_{power-distance}$), it does so for each user (e.g., each radio link connection) scheduled for transmission on the coming TTI. Based on the power factor ($p_{power-distance}$), the users are relatively allocated transmission power. Basically, in this implementation, the power factor ($p_{power-distance}$) values are another input to power control 69 so that power control 69 can determine what power a user should be receiving. As a result of this distant-dependent power factor ($p_{power-distance}$), users with a large distance should be allocated more power than users closer to the site of the base station node 21(9).

As a further addition or adjunct to either the first mode and embodiment or the second mode and embodiment, the modified transmission power can be used to determine an order for the radio link connection within a transmission time interval. That is, in a high load scenario when sequential code allocation is used, i.e. when several users are receiving data during the same transmission time interval (TTI) for shared channels in e.g. HSDPA, the power factor $p_{power-distance}$ (and hence the distance) can be used to set the order in which the users are set to use the TTI. Commonly a first user of a TTI is able to use more power than following users of a TTI.

Figure 11:
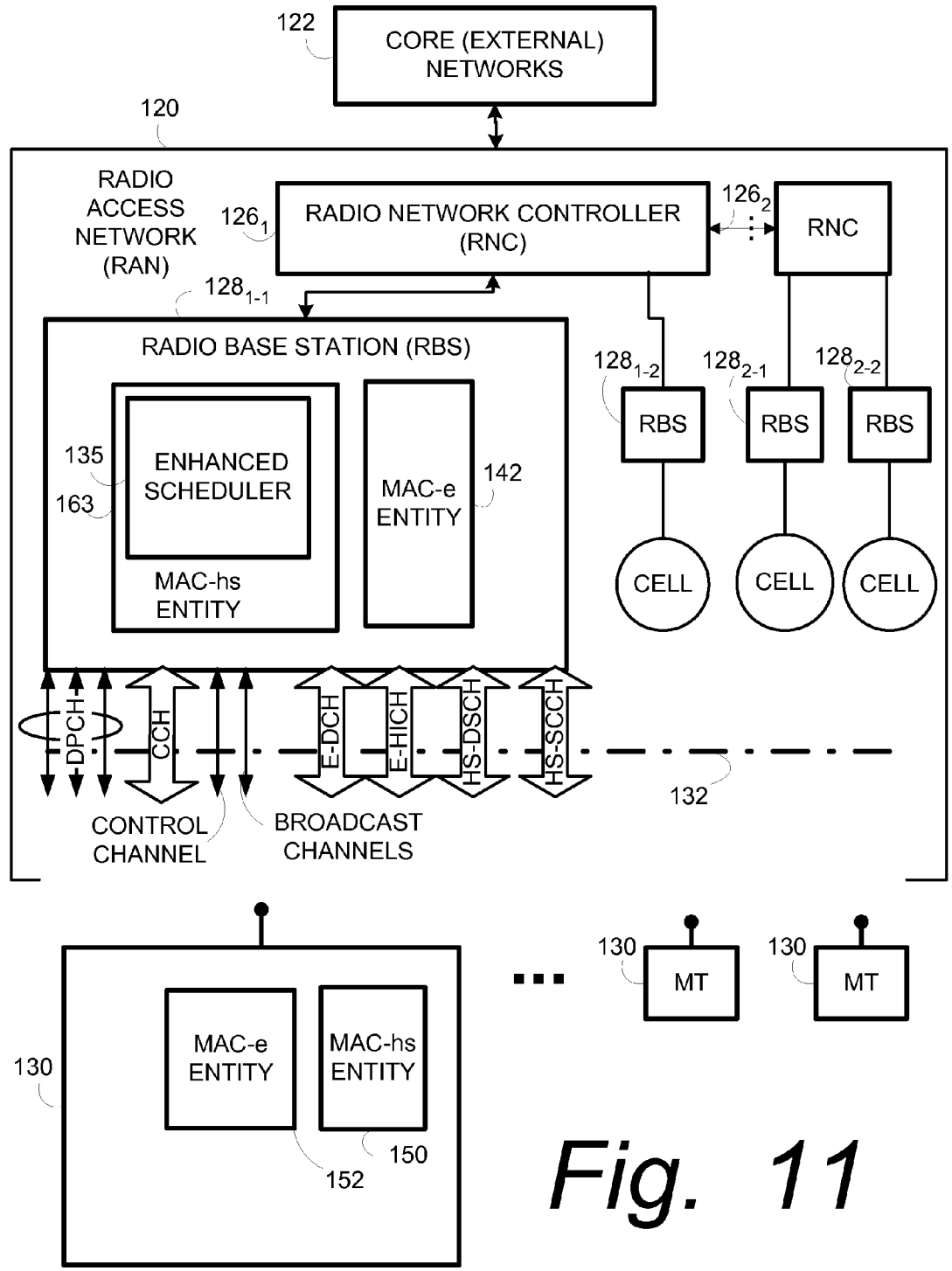
FIG. 11 is schematic view of example mobile communications system in which an enhanced scheduler may be advantageously employed.

The technology described herein advantageously increases coverage for the packet service, e.g., VoIP service. FIG. 11 illustrates an example, non-limiting telecommunications system wherein a radio access network 120 is connected to one or more external (e.g., core) networks 122. The external networks 122 may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., a Mobile Switching Center (MSC) node and a Serving General Packet Radio Service (GPRS) Support node (SGSN) working in conjunction with a Gateway GRPS Support Node (GGSN).

Each of the core network service nodes connects to the radio access network (RAN) 120 over a suitable interface. In the particular, non-limiting example shown in FIG. 11, the radio access network (RAN) 120 is a UMTS Terrestrial Radio Access Network (UTRAN) and the interface with the external network is over the Iu interface. The radio access network (RAN) 120 includes one or more radio network controllers (RNCs) 126 and one or more radio base stations (RBS) 128. For sake of simplicity, the radio access network (RAN) 20 of FIG. 11 is shown with only two RNC nodes, particularly RNC $126_1$ and RNC $126_2$. Each RNC 126 is connected to one or more base stations (BS) 128 over an Iub interface. For example, and again for sake of simplicity, two base station nodes are shown connected to each RNC 126. In this regard, RNC 126₁ serves base station 128₁₋₁ and base station 128₁₋₂, while RNC 126₂ serves base station 128₂₋₁ and base station 128₂₋₂. It will be appreciated that a different number of base stations can be served by each RNC, and that RNCs need not serve the same number of base stations. Moreover, FIG. 11 shows that an RNC can be connected over an Iur interface to one or more other RNCs in the UTRAN 124. Further, those skilled in the art will also appreciate that a base station is sometimes also referred to in the art as a radio base station, a node B, or B-node, as has been done in conjunction with discussion of various previous embodiments. In the example of FIG. 11, a radio network control node is considered a "superior" node to a radio base station node.

It should be understood that at least one and likely more of the RNCs of the radio access network have an interface to one or more core networks. Further, in order to support continuation of established connections when the UE is moving between cells controlled by different RNCs in the Radio Access Network, a Signalling Network (e.g. Signalling System No 7) enables RNCs to perform the required RNC-RNC signalling.

In the illustrated embodiments, for sake of simplicity each base station 128 is shown as serving one cell. For base station 128₁₋₂, for example, the cells are represented by a circle. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

As shown in FIG. 11, mobile terminals (MT) 130 communicates with one or more cells or one or more base stations (BS) 128 over a radio or air interface 132. In differing implementations, the mobile terminals (MT) 130 can be known by different names, such as wireless terminal, mobile station or MS, user equipment unit, handset, or remote unit, for example. Each mobile terminal (MT) may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc. Preferably, at least for a UTRAN implementation of the radio access network (RAN) 20, radio access is based upon Wideband, Code Division Multiple Access (WCDMA) with individual radio channels allocated using CDMA spreading codes. Of course, other access methods may be employed.

FIG. 11 further illustrates in simplified form that different types of channels may exist between one of the base stations 128 and mobile terminals (MT) 130 for transport of control and user data. For example, in the forward or downlink direction, there are several types of broadcast channels, one or more control channels, one or more common traffic channels (CCH), dedicated traffic channels (DPCH), and the high-speed downlink shared channel (HS-DSCH) which is herein of particular interest. The downlink dedicated physical channel (DPCH) carries both the Dedicated Physical Data Channel (DPDCH) and the Dedicated Physical Control Channel (DPCCH). The aforementioned E-DCH channel and E-HICH channel are also shown in FIG. 11. The high-speed downlink shared channel (HS-DSCH) and the high-speed shared control channel (HS-SCCH) are separate channels. As understood by those skilled in the art, the signaling carried by the high-speed shared control channel (HS-SCCH) is performed by transmitting the HS-SCCH TTI two slots in advance of the corresponding HS-DSCH TTI. The HS-SCCH contains information which is sent to the mobile terminals so that the mobile terminals know if they have data to receive on the HS-PDSCh channel or not.

The RNC 126 configures the cell to support HSDPA. Thereafter it is up to the Node-B 128 to allocate power and the amount of codes needed at respective TTI transmissions.

As shown in FIG. 11, the Node-Bs 128 includes a MAC-hs entity 163 for the HSDPA channel and a MAC-e entity 142 for the E-DCH channel. The MAC-hs entity 140 can include the aforementioned embodiments of enhanced schedulers, such s enhanced scheduler 135. Similarly, the UEs 130 include a MAC-hs entity 150 for the HSDPA channel and a MAC-e entity 152 for the E-DCH channel.

It will be appreciated that, in one or more of the aforementioned embodiment and other embodiments encompassed hereby, that the MAC-hs entities, the MAC-e entities, and/or the packet service enhancers may be implemented using individual hardware circuits, using software programs and data in conjunction with one or more suitably programmed digital microprocessors or general purpose computers, using application specific circuitry (ASIC), and/or using one or more digital signal processors (DSPs).

Although various embodiments have been shown and described in detail, the claims are not limited to any particular embodiment or example. None of the above description should be read as implying that any particular element, step, act, range, or function is essential. The invention is not to be limited to the disclosed embodiment, but on the contrary, is intended to cover various modifications and equivalent arrangements.

What is claimed is:

1. For use in a telecommunications system comprising a base station node, a method of operating a downlink channel over an air interface between the base station node and a user equipment unit (UE), the method comprising:
   obtaining an indication of degradation of a radio link connection carried by the downlink channel from the base station node to the user equipment unit; and, in accordance with the indication,
   performing a modification of transmission priority for the radio link connection on the downlink channel relative to other radio link connections which share the downlink channel, the modification being performed on the basis of plural priority factors, at least one of the priority factors being a distance indication, the distance indication being an indication of distance of the user equipment unit (UE) involved in the radio link connection from the base station node;
   determining a nominal transmission priority value for the radio link connection using a first input and a second input, the first input being related to a time delay for a packet residing in a transmission buffer of the base station node and destined for use in the radio link connection, the second input being related to a channel quality index channel quality index (CQI); and
   modifying the nominal transmission priority value with a third input, the third input being related to the distance indication.

2. The method of claim 1, further comprising performing the modification for one or both of downlink and uplink transmissions for the user equipment unit (UE).

3. The method of claim 1, further comprising performing the modification for the radio link connection as a function of the indication.

4. The method of claim 1, wherein the distance indication is obtained from a transmission Timing Advance (TA) for the user equipment unit (UE).

5. The method of claim 1, wherein the distance indication is obtained from a Carrier to Interference Ratio (CIR) report for the user equipment unit (UE) or channel quality index (CQI).

6. The method of claim 1, further comprising:
using plural parameters for determining a time delay for a packet residing in a transmission buffer of the base station node and destined for use in the radio link connection;
adjusting a value of at least one of the plural parameters using the indication to form an adjusted time delay;
using the adjusted time delay to determine a modified transmission priority for the radio link connection.

7. The method of claim 6, further comprising:
establishing a set of distance ranges from the base station node;
adjusting the value of the at least one of the plural parameters based on an associated distance range of the set in which the user equipment unit (UE) involved in the radio link connection belongs.

8. The method of claim 1, further comprising modifying transmission power for the radio link connection as a function of the distance indication.

9. The method of claim 8, further comprising:
modifying transmission power to obtain a modified transmission power for the radio link connection, and
using the modified transmission power to determine an order for the radio link connection in a transmission time interval.

10. A base station node of a telecommunications system which transmits a downlink channel over an air interface between the base station node and a user equipment unit, the base station node comprising:
a transceiver configured to communicate on the downlink channel;
a scheduler configured:
to perform a modification of transmission priority for a radio link connection between the base station node and the user equipment unit (UE) involved in the radio link connection on the downlink channel in accordance with an indication of degradation of a radio link connection carried by the downlink channel, the modification being relative to other radio link connections which share the downlink channel, the modification being performed on the basis of plural priority factors which are input, at least one of the priority factors being a distance indication, the distance indication being an indication of distance of the user equipment unit (UE) involved in the radio link connection from the base station node;
to determine a nominal transmission priority value for the radio link connection using a first input and a second input, the first input being related to a time delay for a packet residing in a transmission buffer of the base station node and destined for use in the radio link connection for the user equipment unit (UE), the second input being related to a channel quality index (CQI); and to modify the nominal transmission priority value with a third input, the third input being related to the distance indication.

11. The apparatus of claim 10, wherein the scheduler is configured to perform the modification for one or both of downlink and uplink transmissions for the user equipment unit (UE).

12. The apparatus of claim 10, wherein the scheduler is configured to perform the modification for the radio link connection as a function of the distance indication.

13. The apparatus of claim 10, wherein the scheduler is configured to obtain the distance indication from a transmission Timing Advance (TA) for the user equipment unit (UE).

14. The apparatus of claim 10, wherein the scheduler is configured to obtain the distance indication from a Carrier to Interference Ratio (CIR) report for the user equipment unit (UE) or a channel quality index (CQI).

15. The apparatus of claim 10, wherein the scheduler is configured:
to use plural parameters for determining a time delay for a packet residing in a transmission buffer of the base station node and destined for use in the radio link connection for the user equipment unit (UE);
to adjust a value of at least one of the plural parameters using the distance indication to form an adjusted time delay;
to use the adjusted time delay to determine a modified transmission priority for the radio link connection.

16. The apparatus of claim 15, wherein a set of distance ranges are established from the base station node; and wherein the scheduler is configured to adjust the value of the at least one of the plural parameters based on an associated distance range of the set in which the user equipment unit (UE) involved in the radio link connection belongs.

17. The apparatus of claim 10, further comprising a power control unit, and wherein in accordance with the distance indication the base station node is configured to generate a modified transmission power for use by the power control unit for transmissions on the radio link connection.

18. The apparatus of claim 17, wherein the modified transmission power is a function of the distance indication.

19. The method of claim 1, further comprising applying the plural priority factors as inputs to a same modification determination for a particular radio link connection.

20. The apparatus of claim 10, wherein the scheduler is configured to receive the plural priority factors as inputs to a same modification determination for a particular radio link connection.

21. For use in a telecommunications system comprising a base station node, a method of operating a downlink channel over an air interface between the base station node and a user equipment unit (UE), the method comprising:
obtaining an indication of degradation of a radio link connection carried by the downlink channel from the base station node to the user equipment unit; and, in accordance with the indication,
performing a modification of transmission priority for the radio link connection on the downlink channel relative to other radio link connections which share the downlink channel, the modification being performed on the basis of plural priority factors, at least one of the priority factors being a distance indication, the distance indication being an indication of distance of the user equipment unit (UE) involved in the radio link connection from the base station node;
using plural parameters for determining a time delay for a packet residing in a transmission buffer of the base station node and destined for use in the radio link connection;
adjusting a value of at least one of the plural parameters using the indication to form an adjusted time delay;
using the adjusted time delay to determine a modified transmission priority for the radio link connection.

22. The method of claim 21, further comprising:
establishing a set of distance ranges from the base station node;

adjusting the value of the at least one of the plural parameters based on an associated distance range of the set in which the user equipment unit (UE) involved in the radio link connection belongs.

23. A base station node of a telecommunications system which transmits a downlink channel over an air interface between the base station node and a user equipment unit, the base station node comprising:
- a transceiver configured to communicate on the downlink channel;
- a scheduler configured:
  - to perform a modification of transmission priority for a radio link connection between the base station node and the user equipment unit (UE) involved in the radio link connection on the downlink channel in accordance with an indication of degradation of a radio link connection carried by the downlink channel, the modification being relative to other radio link connections which share the downlink channel, the modification being performed on the basis of plural priority factors which are input, at least one of the priority factors being a distance indication, the distance indication being an indication of distance of the user equipment unit (UE) involved in the radio link connection from the base station node;
  - to use plural parameters for determining a time delay for a packet residing in a transmission buffer of the base station node and destined for use in the radio link connection for the user equipment unit (UE);
  - to adjust a value of at least one of the plural parameters using the distance indication to form an adjusted time delay;
  - to use the adjusted time delay to determine a modified transmission priority for the radio link connection.

24. The apparatus of claim 23, wherein a set of distance ranges are established from the base station node; and wherein the scheduler is configured to adjust the value of the at least one of the plural parameters based on an associated distance range of the set in which the user equipment unit (UE) involved in the radio link connection belongs.

* * * * *